US011543268B2

(12) United States Patent
Bouchet

(10) Patent No.: US 11,543,268 B2
(45) Date of Patent: Jan. 3, 2023

(54) INDUCTIVE OPTICAL ROTARY SENSOR

(71) Applicant: Ratier-Figeac SAS, Figeac (FR)

(72) Inventor: Arnaud Bouchet, Planioles (FR)

(73) Assignee: RATIER-FIGEAC SAS, Figeac (FR)

(*) Notice: Subject to any disclaimer, the term of this patent is extended or adjusted under 35 U.S.C. 154(b) by 639 days.

(21) Appl. No.: 16/573,211

(22) Filed: Sep. 17, 2019

(65) Prior Publication Data
US 2020/0240814 A1 Jul. 30, 2020

(30) Foreign Application Priority Data
Jan. 25, 2019 (EP) .................................... 19290007

(51) Int. Cl.
*G01D 5/26* (2006.01)
*H04B 10/50* (2013.01)

(52) U.S. Cl.
CPC ........... *G01D 5/264* (2013.01); *H04B 10/502* (2013.01)

(58) Field of Classification Search
CPC ........ D21H 11/02; D21H 17/14; D21H 17/62; D21H 27/10; H04B 5/0075; H04B 10/502; H04B 5/0037; G01D 21/00; G01D 5/2066; G01D 5/264; G01D 5/2086; G01D 5/20666; H02K 24/00; G01P 13/02
USPC .......... 356/141.1, 4.01, 5.01, 152.2; 250/236
See application file for complete search history.

(56) References Cited

U.S. PATENT DOCUMENTS

| 4,661,698 | A |   | 4/1987  | Cappio et al. |           |
|-----------|---|---|---------|---------------|-----------|
| 4,829,247 | A | * | 5/1989  | Wallrafen     | H02K 24/00 |
|           |   |   |         |               | 324/207.17 |
| 6,919,559 | B2 |   | 7/2005  | McCarty et al. |          |
| 8,239,161 | B2 |   | 8/2012  | Schneider et al. |        |
| 9,977,119 | B2 |   | 5/2018  | Wu et al.     |           |
| 2008/0243429 | A1 | * | 10/2008 | Yoshino   | G01S 7/4817 |
|           |   |   |         |               | 702/159   |
| 2013/0328428 | A1 | * | 12/2013 | Yang      | H02K 19/12 |
|           |   |   |         |               | 310/112   |
| 2015/0123679 | A1 |   | 5/2015  | Kuyvenhoven et al. |     |
| 2017/0117757 | A1 | * | 4/2017  | Park       | H02J 50/12 |
| 2017/0141604 | A1 | * | 5/2017  | Park       | H02J 7/025 |
| 2018/0191404 | A1 |   | 7/2018  | Berger et al. |         |
| 2019/0036368 | A1 | * | 1/2019  | Lo          | H02J 50/12 |

FOREIGN PATENT DOCUMENTS

JP          2011112537 A       6/2011

OTHER PUBLICATIONS

Extended European Search Report for International Application No. 19290007.4 dated Jul. 18, 2019, 26 pages.

* cited by examiner

*Primary Examiner* — Isiaka O Akanbi
(74) *Attorney, Agent, or Firm* — Cantor Colburn LLP

(57) ABSTRACT

A rotary position sensor is includes a static portion that comprises a first board and a second board and a rotatable portion that comprises a third board. The second board comprises a first planar coil; and the third board comprises a second planar coil as well as means for generating luminance. The first board comprises means for receiving the generated luminance and the first planar coil of the second board is configured to transmit power to said second planar coil of said third board via inductance. The power received by said second planar coil is configured to supply a current to said means for generating luminance; and said means for generating luminance is configured to emit a luminance signal which has a luminance level.

16 Claims, 3 Drawing Sheets

Coils aligned
Maximum coupling coefficient

Angular bound #1

Coils misaligned
Minimum coupling coefficient

Angular bound #2

INDUCTIVE OPTICAL ROTARY SENSOR

FOREIGN PRIORITY

This application claims priority to European Patent Application No. 19290007.4 filed Jan. 25, 2019, the entire contents of which is incorporated herein by reference.

FIELD

The present disclosure relates to rotary sensors and in particular, rotary sensors that may be used in avionic and aeronautical applications.

BACKGROUND

Rotary position sensors are commonly used in many avionic and aeronautical applications. They are also widely used in industrial fields such as plant control, robotics and the automobile fields. Nowadays it is preferred to use contactless rotary position sensor, as they provide greater durability due to reduced wear of the mechanical components.

Such known contactless sensors can be quite complex, however, and often require some form of demodulation of the output signal in order to retrieve the angle information.

These types of sensors use different types of technology in order to determine an angle measurement. For example, sensors may use measurements such as: potentiometric, inductive (RVDT), capacitive, magnetic and optical (e.g. RB sensors, diffraction measurement or luminance through a polarizer).

Some known contactless sensors that are optical sensors require specific optical elements between the rotor and the stator in order to achieve the rotation angle measurement.

U.S. Pat. No. 4,661,698 describes a rotary optical transducer. The optical transducer is connectable to a fixed body and a rotary member for detecting the angular position of the rotary member with respect to the fixed body. The optical transducer comprises light emitting means for emitting a light beam having a predetermined axis and a light detector means.

U.S. Pat. No. 6,919,559B2 describes a high temperature optical rotary and linear position sensor. The sensor comprises a first member carrying a source of light and a second, rotatable member that rotates about an axis relative to the source of light. The sensor uses these components in combination with a light reflecting surface that is fixedly attached to the second member and a reflected light receiving member that is fixed relative to the source of light in order to determine a rotary position.

SUMMARY

A rotary position sensor is described herein that comprises a static portion which comprises a first board and a second board and a rotatable portion that comprises a third board. The second board comprises a first planar coil and the third board comprises a second planar coil as well as means for generating luminance. The first board comprises means for receiving the generated luminance. The first planar coil of the second board is configured to transmit power to the second planar coil of the third board via inductance. The power received by the second planar coil is configured to supply a current to the means for generating luminance. The means for generating luminance is configured to emit a luminance signal which has a luminance level and the means for receiving the luminance is configured to measure the luminance level, the luminance level being directly related to an angle of rotation of the third board.

In any of the examples of the sensors and/or methods described herein, the luminance level may be directly proportional to the amount of power received by the second planar coil.

In any of the examples of the sensors and/or methods described herein, the means for receiving luminance may comprise a light sensor.

In any of the examples of the sensors and/or methods described herein, the means for receiving luminance may be provided on a surface of the first board that is facing a surface of the second board.

In any of the examples of the sensors and/or methods described herein, the first board may comprise means for receiving DC power from a power supply.

In any of the examples of the sensors and/or methods described herein, the means for generating luminance may be provided on a surface of the third board that is facing a surface of the second board.

In any of the examples of the sensors and/or methods described herein, the means for providing luminance may comprise an emitter LED or LEDs.

In any of the examples of the sensors and/or methods described herein, the first board may be configured to provide power to the first coil of said second board.

In any of the examples of the sensors and/or methods described herein, the second board may be positioned between the first board and the third board.

In any of the examples of the sensors and/or methods described herein, the means for generating luminance may generate the luminance in the direction of the first board.

In any of the examples of the sensors and/or methods described herein, the first and second planar coils may be positioned so as to face each other.

A method of manufacturing a rotary position sensor is also described herein and comprises providing: a) a static portion comprising a first board and a second board; and b) a rotatable portion comprising a third board. The method further comprises providing a first planar coil on the second board; and providing a second planar coil and a means for generating luminance on the third board; and providing means for receiving the luminance on the first board. The first planar coil of the second board is configured to transmit power to the second planar coil of the third board via inductance. The power received by the second planar coil is configured to supply a current to the means for generating luminance. The means for generating luminance is configured to emit a luminance signal having a luminance level and the means for receiving the luminance is configured to measure the luminance level, the luminance level being directly related to an angle of rotation of the third board.

In any of the examples of the sensors and/or methods described herein, the luminance level may be directly proportional to an amount of said power that is received by said second planar coil.

In any of the examples described herein, the method may further comprise connecting a DC power supply to the first board.

In any of the examples of the sensors and/or methods described herein, the first board may be configured to generate, from the DC power supply, an AC power supply, and the first board may be further configured to provide the AC power supply to the first coil of the second board.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The examples described herein may be used in a number of technical fields, including the avionic and aeronautical fields. Contactless rotary position sensors are commonly used in these fields, however, they have drawbacks in that the output signal often has to be demodulated in order to retrieve angle information. They also have the drawback that both the rotary and static parts have to be supplied with power. The examples described herein therefore aim to overcome these drawbacks as described in detail below.

Figure 1:
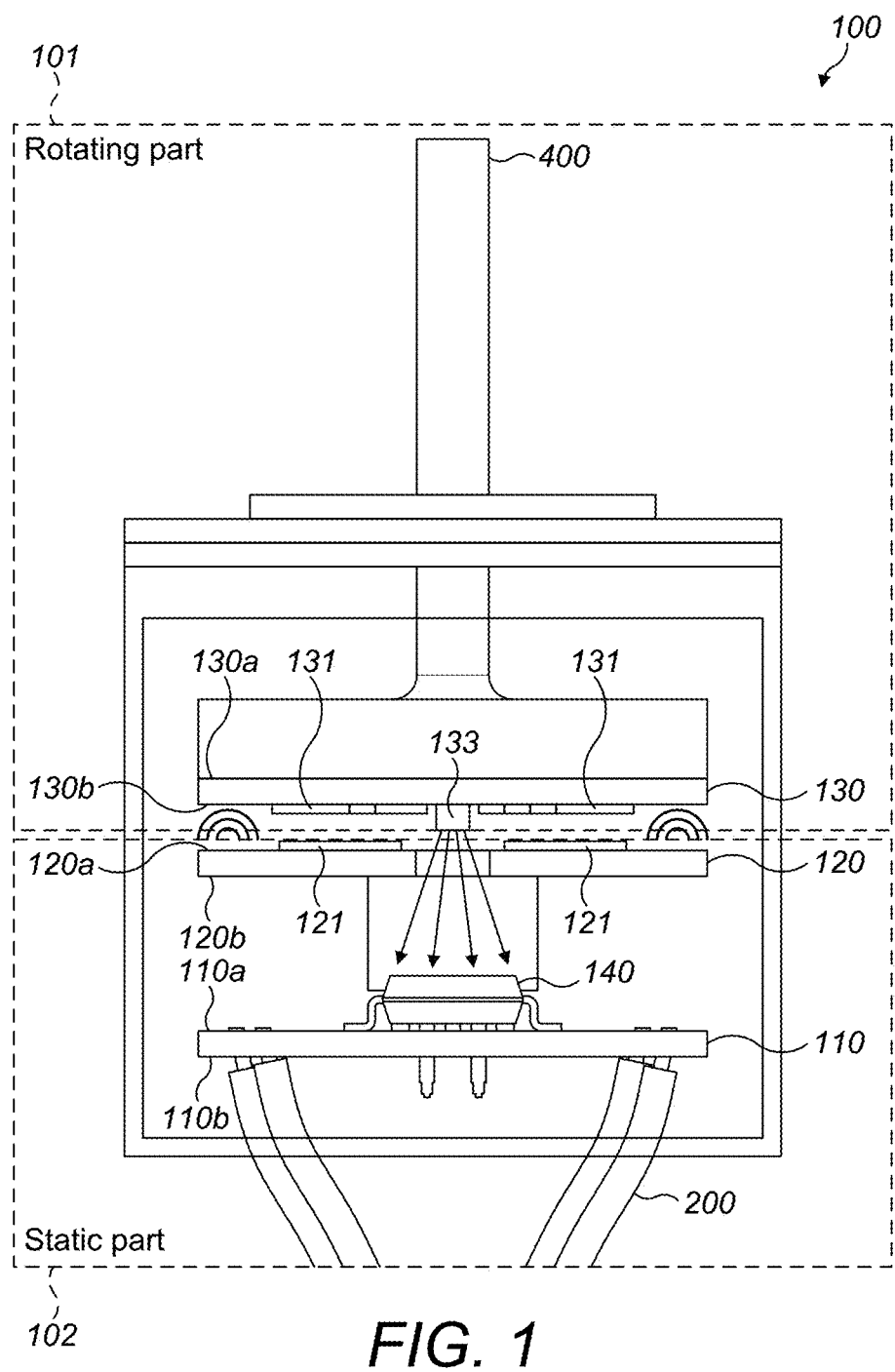
FIG. 1 illustrates a side view of a new type of rotary position sensor as described herein.

An example of a new type of rotary position sensor 100 is shown in FIG. 1. As can be seen in the figure, the sensor 100 comprises a rotating, or rotatable, part 101 and a static part 102. The static part 102 comprises a first board 110 and a second board 120. The rotatable part 101 comprises a third board 130. That is, in use, the first board 110 and second board 120 are fixed in position, while the third board 130 is mounted on a rotary shaft 400 and is therefore rotatable relative to the first 110 and second boards 120.

The three boards each have first and second opposite planar surfaces, which in FIG. 1 can be seen as a first, (or in the particular example shown in FIG. 1, lower) facing surface 110b, 120b, 130b and a second, opposite facing (in this case upper facing) surface 110a, 120a., 130a. In use, the three boards 110, 120, 130 are stacked so that the second, or upper, facing surface 110a of the first board 110 faces the first, or lower facing surface 120b of the second board 120 and so that the first, or lower facing, surface 130b of the third board 130 faces the second, or upper, facing surface 120a of the second board 120. That is, the second board 120 is positioned between the surfaces of the first 110 and third boards 130 as shown in FIG. 1. The words "upper" and "lower" as described herein are merely used for reference in relation to FIG. 1 and the device does not necessarily have to be held in the exact position as shown in FIG. 1.

A rotor 400 is provided so as to provide rotation to the third board 130 relative to the static part 102. In the example shown in FIG. 1, this is achieved by the rotor 400 being in contact with the upper surface 130a of the third board, however, other examples may comprise the rotor 400 being associated with the third board 130 in other ways so as to still provide rotation.

The first board 110 also comprises means 140 for receiving and measuring luminance. In some examples, this may comprise a light sensor 140. As can be seen in FIG. 1, the light sensor 140 may be provided on the second, or upper, surface 110a of the first board 110, i.e. the surface 110a that is facing the first, or lower, surface 120b of the second board 120.

Means for generating luminance 133 is associated with the third board so as to be able to generate and provide luminance in the direction of both the second 120 and first boards 110 and ultimately to provide luminance to the means 140 for receiving and measuring luminance that is associated with the first board 110. In this way, the generated luminance is received and measured by the means 140 described above.

In the example shown in FIG. 1, the means for generating luminance 133 is provided on the first, or lower, surface 130b of the third board 130, i.e. it is provided on the surface facing the second board 120. In some examples, this means for providing luminance 133 may comprise emitter LEDs 133. Other means for providing luminance may alternatively be used.

The second board 120 and the third board 130 also comprises one or more planar coils 121, 131. The one or more planar coils 131 that are provided on the third board 130 are provided on or embedded in its first, or lower, surface 130a (i.e. on or in the surface 130b that is facing the planar coil(s) 121 of the second board 120.

The second board 120 also comprises one or more planar coils 121 provided on or embedded into its surface 120a that is facing the third board 130 and the device uses this/these coils 121 on the second board 120 to transmit power to the coils 131 of the third board 130.

Figure 2:
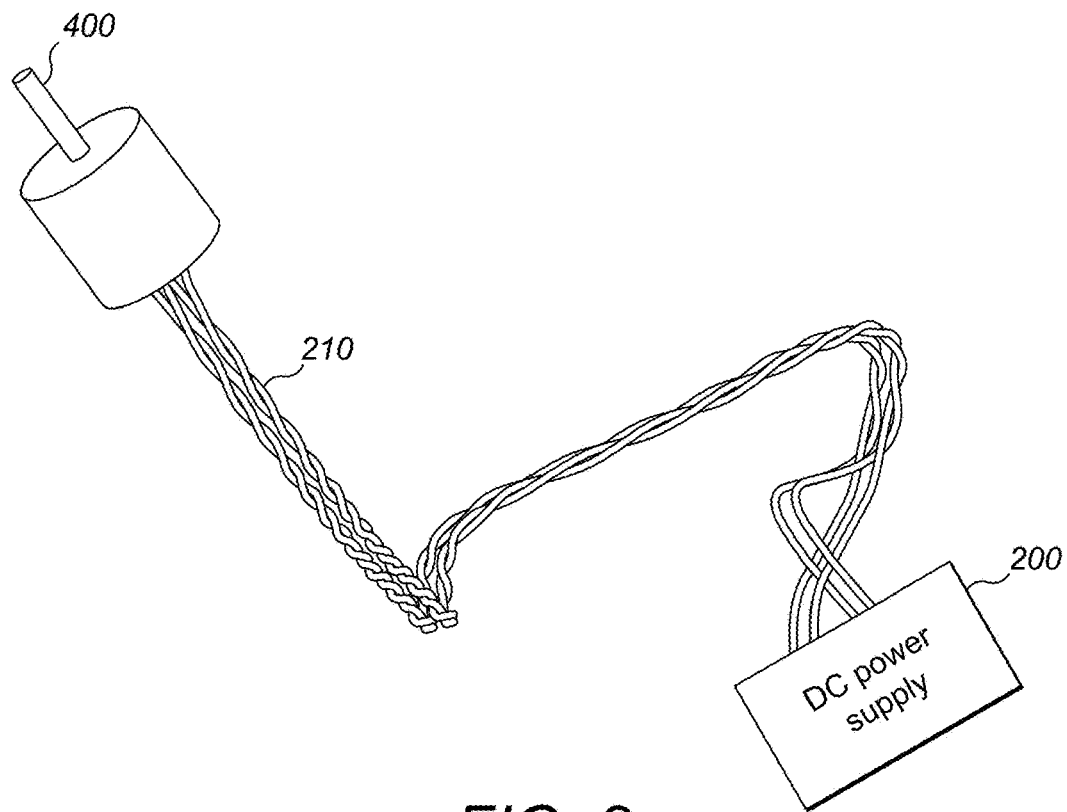
FIG. 2 provides an overview of the new types of optical rotary sensor described herein.

The first board 110 comprises means 210 for receiving DC power from an external power supply 200 (shown in FIG. 2) and is also configured to use this DC voltage to generate an AC current associated with/on the first board 110. The first board 110 is also configured to then supply this AC current to the coil(s) 121 that is/are provided on the second board 120. This/these coil(s) 121 are also configured to thereby generate, by induction, a corresponding FEM at the coil(s) terminal 131 that are provided on the third board 130.

This is achieved by, in use, an AC current being generated on the first board 110 using the input DC voltage described above, that is provided by the means for supplying a DC voltage 210. This AC current in turn supplies the coil(s) 121 that is/are provided on the second board 120 and the coil(s) 121 of the second board 120 thereby generate(s), by induction, a corresponding FEM at the coil(s) terminal 131 that is provided on the third board 130. Once rectified, this voltage is then used to supply current to the means for generating luminance 133 (i.e. the emission LED(s)) on 130.

In the example shown in FIG. 1, the LED 133 then emits a luminance signal which has a luminance level that is directly proportional to the LED 133 current supply. The luminance level of this signal is measured by the light sensor 140 that is provided on the first board 110, as described above. The functional architecture of this system is shown in FIG. 4.

Figure 4:
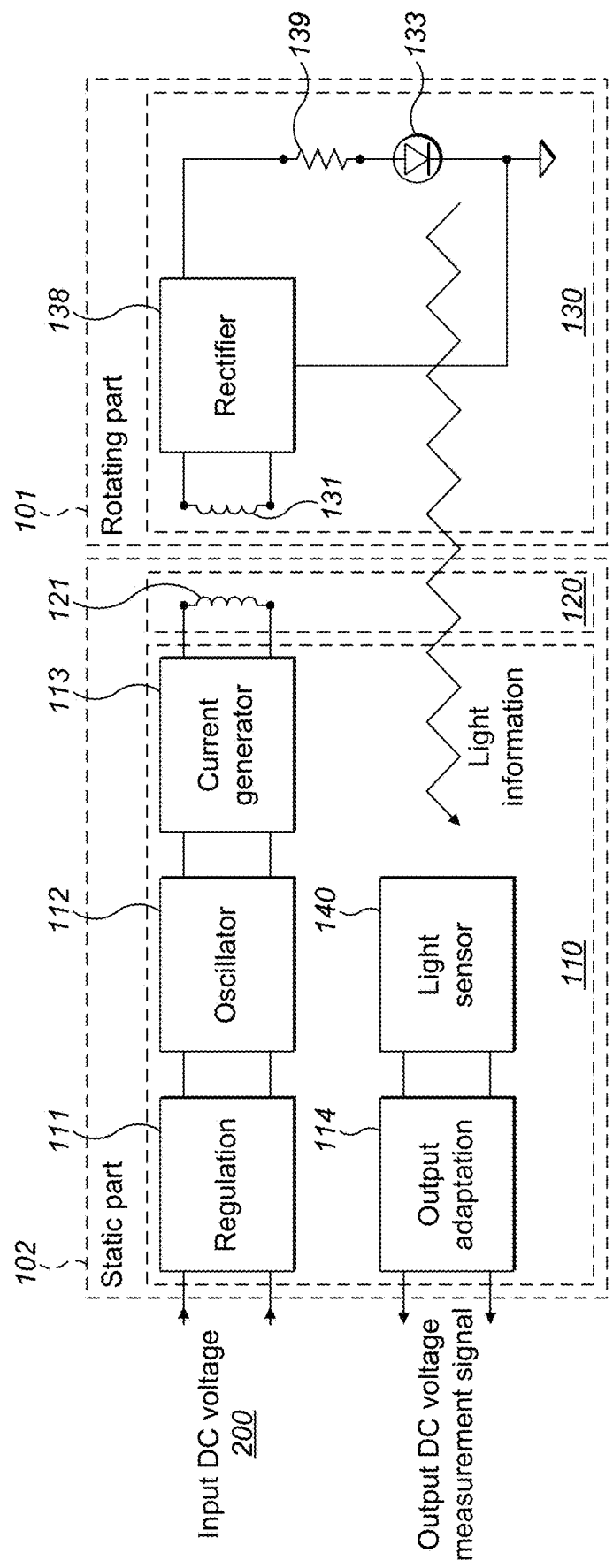
FIG. 4 depicts a functional overview of the system.

The functional architecture shown in FIG. 4 represents the functional breakdown between static and rotating parts. The static part 102 includes the first board 110 and the second board 120 and FIG. 4 shows all of the components connected to them. The rotating part includes the third board 130 and FIG. 4 also shows all the components connected to it.

In the static part 102, the input DC voltage is acquired on the first board 110 via the DC voltage input means 200. In some examples, the DC voltage may then be filtered and regulated by a regulation unit provided on/in association with the first board 110, to avoid any perturbation. Then an AC voltage is generated via an oscillation unit 112 using this regulated DC voltage. A current generator unit 113 may then be used to generate the relevant AC current using this AC voltage. This AC current is then sent to the coil(s) 121 located in or on the second board 120.

On the rotating part, this AC current thereby creates, by induction, a corresponding AC voltage (FEM) at the coils 131 terminal on the third board 130. A rectifier unit 138 may also be provided that is associated with the third board 130 so that this voltage is rectified and is used to supply the corresponding LED(s) 133 using the proper voltage-to-current converter block 139 (here symbolized by a resistor).

The light generated by this (these) LED(s) 133 on the third board 130 is measured by the light sensor(s) 140 that are provided on the first board 110, which generates the proper voltage value dependent to the luminance measured. A further component(s) 144 may be provided associated with the first board 110 so that this voltage may then be then adapted or modified (by amplification, for example) and/or converted to current (voltage to current adaptation) and/or digitalized to be send on numerical bus.

Figure 3A:
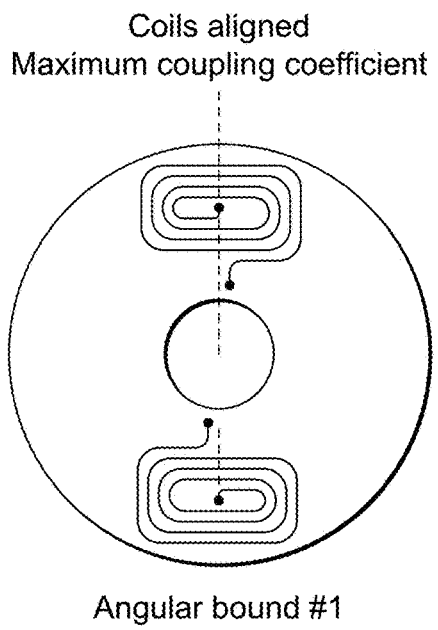
FIG. 3a depicts a situation wherein the coils of the second and third boards of the sensor shown in FIG. 1 are aligned and have the maximum coupling coefficient.
Figure 3B:
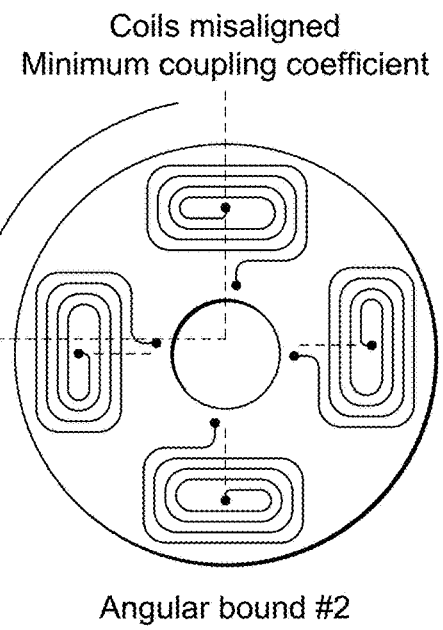
FIG. 3b depicts a situation wherein the coils of the second and third boards of the sensor shown in FIG. 1 are misaligned and have the minimum coupling coefficient.

In use, during rotation of the third board 130 around the Z-axis, the source coil(s) 121 on the second board 120 and the receiver coil(s) 131 on the third board 130 are misaligned, as shown in FIG. 3b. This leads to decreasing mutual inductance (and coupling coefficient) between the coils 121 and 131. As a consequence, the voltage at the coil(s) 131 terminals on the third board 130 decreases, causing the corresponding current supplying the LED(s) 133 on the third board 130 to decrease as well. This causes the LED light intensity to be reduced with rotation angle. The measurement of the incident light generated by the third board 130 (which may also be referred to as the source board 130) is directly linked to the rotation of the rotor 400. This information can therefore be used for outputting a DC signal linked to the rotation angle.

Transmission of this value can also be done using a numerical value and using an appropriate AC/DC converter or smart light sensor.

FIGS. 3a and 3b show two examples of coil alignment/misalignment. The first boundary angle in FIG. 3a corresponds to a situation wherein maximum coupling is occurring. That is, the coils 121, 131 of the second 120 and third boards 130 are aligned. The second boundary shown in FIG. 3b depicts a situation wherein the coils 121, 131 are misaligned and this corresponds to the lower coupling.

In some examples only one coil 121 is used on the second board 120 and one coil 131 is used on the third board 130. In other examples, a plurality of coils 121, 131 may be used on both the second and third boards 120, 130. It may also be possible to increase the angular range by using two LEDs 133 of different wavelengths coupled with associated sensors. It is also possible, when using two or more LED(s) 133 with different wavelengths, to know the sign of rotation value (in a fixed and predefined geometrical reference).

The examples described herein provide an improved rotary position sensor having at least the following benefits over known sensors: a) the sensor is contactless and thereby reduces wear and increases durability, b) it is a low power sensor (as it uses LED light which has a low power consumption), c) the sensor has an easy mounting operation (since the light measurement allows little z-axis shift between the rotatable and static parts), d) the sensor requires no optical guide and also requires no lens, e) only the static part of the sensor (and not the rotatable part) needs to be supplied with power f) the sensor can be used with a DC supply and so there is no need for any external excitation.

The invention claimed is:

1. A rotary position sensor comprising:
 a) a static portion comprising a first board and a second board; and
 b) a rotatable portion comprising a third board;
 wherein said second board comprises a first planar coil;
 wherein said third board comprises a second planar coil and means for generating luminance; and
 wherein said first board comprises means for receiving said luminance;
 wherein said first planar coil of said second board is configured to transmit power to said second planar coil of said third board via inductance;
 wherein said power received by said second planar coil is configured to supply a current to said means for generating luminance; and
 wherein said means for generating luminance is configured to emit a luminance signal which has a luminance level and wherein said means for receiving said luminance is configured to receive and measure said luminance level, said luminance level being directly related to an angle of rotation of said third board.

2. The sensor of claim 1, wherein said luminance level is directly proportional to said amount of power received by said second planar coil.

3. The sensor of claim 1, wherein said means for receiving luminance comprises a light sensor.

4. The sensor of claim 1, wherein said means for receiving luminance is provided on a surface of the first board that is facing a surface of the second board.

5. The sensor of claim 1, wherein said first board comprises means for receiving DC power from a power supply.

6. The sensor of claim 1, wherein the means for generating luminance is provided on a surface of the third board that is facing a surface of the second board.

7. The sensor of claim 1, wherein said means for providing luminance comprises an emitter LED or LEDs.

8. The sensor of claim 1, wherein first board is configured to provide power to said first coil of said second board.

9. The sensor of claim 1, wherein said second board is positioned between said first board and said third board.

10. The sensor of claim 1, wherein said means for generating luminance generates said luminance in the direction of said first board.

11. The sensor of claim 1, wherein said first and second planar coils are positioned so as to face each other.

12. The sensor of claim 1, wherein a degree of magnetic coupling between said first planar coil of the second board and said second planar coil of said third board varies with an angle of rotation of said third board.

13. A method of manufacturing a rotary position sensor comprising providing:
 a) a static portion comprising a first board and a second board; and b) a rotatable portion comprising a third board; and
 the method further comprising providing a first planar coil on said second board; and
 providing a second planar coil and a means for generating luminance on said third board; and
 providing means for receiving said luminance on said first board;
 wherein said first planar coil of said second board is configured to transmit power to said second planar coil of said third board via inductance;
 wherein said power received by said second planar coil is configured to supply a current to said means for generating luminance; and wherein said means for generating luminance is configured to emit a luminance signal having a luminance level and wherein said means for receiving said luminance is configured to receive and measure said luminance level, said luminance level being directly related to an angle of rotation of said third board.

14. The method of claim 13, wherein said luminance level is directly proportional to an amount of said power that is received by said second planar coil.

15. The method of claim 11, further comprising connecting a DC power supply to said first board.

16. The method of claim 13, wherein said first board is configured to generate, from said DC power supply, an AC power supply, and wherein said first board is further configured to provide said AC power supply to said first coil of said second board.

\* \* \* \* \*